US00RE46923E

(19) United States
(12) Reissued Patent
Wells

(10) Patent Number: US RE46,923 E
(45) Date of Reissued Patent: Jun. 26, 2018

(54) ELECTRICAL CONNECTION DEVICE

(71) Applicant: Connec Limited, New South Wales (AU)

(72) Inventor: Mark Wells, Dudley (AU)

(73) Assignee: CONNEC LIMITED, Rushcutters Bay (AU)

(21) Appl. No.: 14/751,990

(22) Filed: Aug. 13, 2015

Related U.S. Patent Documents

Reissue of:
(64) Patent No.: 7,357,657
Issued: Apr. 15, 2008
Appl. No.: 10/542,889
PCT Filed: Jan. 20, 2004
PCT No.: PCT/AU2004/000064
§ 371 (c)(1),
(2) Date: Nov. 18, 2005
PCT Pub. No.: WO2004/066452
PCT Pub. Date: Aug. 5, 2004

(30) Foreign Application Priority Data

Jan. 20, 2003 (AU) ..... 2003900291
May 9, 2003 (AU) ..... 2003902257

(51) Int. Cl.
*H01R 13/15* (2006.01)
*H01R 13/20* (2006.01)
*H01R 13/639* (2006.01)
*H01R 13/62* (2006.01)
*H01R 13/58* (2006.01)

(52) U.S. Cl.
CPC ..... *H01R 13/20* (2013.01); *H01R 13/639* (2013.01); *H01R 13/58* (2013.01); *H01R 13/62* (2013.01)

(58) Field of Classification Search
CPC ..... H01R 13/20; H01R 13/639; H01R 13/58; H01R 13/62
USPC ..... 439/263
See application file for complete search history.

(56) References Cited

U.S. PATENT DOCUMENTS 1,956,037 A * 4/1934 Macdonald ..... 439/848
2,269,314 A * 1/1942 Macdonald ..... 439/848
2,680,636 A 6/1954 Griffin
(Continued)

FOREIGN PATENT DOCUMENTS

CA 2193795 6/1998
DE 466767 10/1928
(Continued)

*Primary Examiner* — Albert J Gagliardi
(74) *Attorney, Agent, or Firm* — Allen Dyer Doppelt & Gilchrist PA

(57) ABSTRACT

An electrical connection device is arranged for connection to a machine cable and includes a pin and a socket. The pin and the socket have engagement surfaces with the pin or socket having another surface that forms a wedging surface for the device. The pin and the socket are moveable relative to each other from a released position to an engaging position in which the engaging surfaces form an electrical contact. The device also includes a wedge portion arranged to impart a force on the wedging surface by contacting the wedging surface on movement to the engaging position. The pin and the socket are arranged so that the engagement surfaces move into opposing relationship on movement to the engaging position and the force imparted on the wedging surface biases one engagement surface against an opposing engagement surface.

21 Claims, 3 Drawing Sheets

(56) References Cited

U.S. PATENT DOCUMENTS

| | | | | | |
|---|---|---|---|---|---|
| 2,967,289 | A | | 1/1961 | Day | |
| 3,564,487 | A | | 2/1971 | Upstone et al. | |
| 3,761,870 | A | * | 9/1973 | Drezin et al. | 439/584 |
| 4,105,280 | A | | 8/1978 | Thompson, Jr. | |
| 4,775,335 | A | | 10/1988 | Havel | |
| 5,149,279 | A | | 9/1992 | Kruse | |
| 5,358,433 | A | | 10/1994 | Dechanteloup et al. | |
| 5,601,443 | A | * | 2/1997 | Stinsky et al. | 439/263 |
| 5,624,288 | A | | 4/1997 | Becker | |
| 5,713,765 | A | | 2/1998 | Nugent | |
| 6,109,984 | A | | 8/2000 | Tsou | |

FOREIGN PATENT DOCUMENTS

| | | |
|---|---|---|
| DE | 3345 128 | 7/1984 |
| DE | 3604093 | 8/1987 |
| DE | 40 23 073 | 1/1992 |
| EP | 0066441 | 8/1982 |
| FR | 414469 | 9/1910 |
| GB | 2230389 | 10/1990 |
| GB | 2277207 | 10/1994 |
| JP | 08-315924 | 11/1996 |
| RU | 1830160 | 7/1993 |
| SU | 1698923 | 12/1991 |

* cited by examiner

ELECTRICAL CONNECTION DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of International Application No. PCT/AU2004/000064, filed 20 Jan. 2004 which claims the benefit of Australian Application No. 2003900291, filed 20 Jan. 2003 and Australian Application No. 2003902257, filed 9 May 2003, the disclosures of which are hereby incorporated herein in their entireties by reference.

FIELD OF THE INVENTION

The present invention broadly relates to an electrical connection device for a machine, reeling or trailing cable. Throughout this specification the term "machine cable" is used for any machine, reeling or trailing cable that is arranged for delivery of power to mobile machinery such as large machinery in petroleum or mining industry.

BACKGROUND OF THE INVENTION

Machine, reeling or trailing cables are typically used to provide an electrical connection for mobile electrical machines. For example, in the mining or petroleum industry often large electrical machinery is used and each machine, reeling or trailing cable may have to provide power in the order of a few hundred kilowatts. Typically such power is delivered with a voltage of one or more kilovolts. The cables used to deliver the electricity are usually formed from a plurality of bunches which are connected using electrical connection devices including sockets and pins.

FIG. 1 shows a schematic cross-sectional representation of a typical prior art electrical connection device 10. The device 10 comprises a housing 12 in which a socket 14 and a pin 16 engage. The socket 14 is metallic and includes six fingers 18 and a compression spring 19 is arranged to press the fingers 18 and/or tips of the fingers against the pin 16 to establish an electrical connection. However, the compression spring 19 may loose tension over time, in particular when the electrical connection device is exposed to a heat source or when large currents flow though the device which may result in heat development.

SUMMARY OF THE INVENTION

The present invention provides in a first aspect an electrical connection device arranged for connection to a machine cable, the device comprising:

a pin and a socket, each having engagement surfaces and one of the pin and the socket having a further surface that forms a wedging surface for the device, the pin and the socket being moveable relative to each other from a released position to an engaged position in which the engagement surfaces are engaged to form an electrical contact and a wedge portion arranged to impart a force on the wedging surface on movement to the engaged position, wherein the pin and the socket are arranged so that the engagement surfaces move into opposing relationship on movement to the engaged position and the force imparted on the wedging surface biases one of the opposing engagement surfaces against the other engagement surface.

As a portion of one of the pin and the socket is wedged against a portion of the other one of the pin and the socket, the electrical connection device has the advantage that a firm electrical connection can be established without a compression spring. Further, the engagement may be stronger than an electrical connection that may be achieved with typical prior art devices.

The electrical connection device typically is arranged for delivery of a power of a few hundred kilowatts. Further, the electrical connection device typically is arranged for delivery of power having an associated voltage of one or more kilovolts.

The wedge portion typically is not integrally formed with the pin or the socket and may comprise a material other than that of the pin or the socket. For example, the wedge portion may be a part that is separable from the pin or the socket. The wedge portion may also be adhered to a portion of the pin or the socket.

At least one of the pin and the socket typically has a marginal portion that includes the wedging surface and that has at least one gap which expands or reduces when the wedge portion imparts a force on the marginal portion so that the outer perimeter of the marginal portion expands or compresses.

The marginal portion typically is a part of the socket. In this case the wedge portion may be arranged such that, when the pin and the socket are moved relative to each other to the engaged position, the wedge portion compresses the marginal portion against the pin whereby the pin and the socket engage to establish the electrical connection.

The socket typically is of a longitudinal shape and the marginal portion typically is an end-portion of the socket.

The wedge portion may comprise a flexible material that typically is resilient. The flexible material may be a polymeric material and such as a rubber. The wedge portion typically comprises an electrically conductive material such as an electrically conductive polymeric material.

As discussed above, because of the wedge portion a firm electrical connection may be established without a compression spring. If the wedge portion comprises the flexible material, such as the polymeric material, disconnecting the pin and the socket, which typically are composed of a metallic material, is facilitated.

For example, the pin and the socket may be of a generally round cross-section. The socket and the pin may be, when in the engaged position, surrounded by a sleeve. In this case the pin typically is secured in the sleeve.

The wedge portion may be provided in form of a ring-like portion positioned such that, when the pin and the socket are moved relative to each other towards the engaged position, the wedge portion wedges the end-portion of the socket against the pin. This has the advantage that the socket may be fitted over the pin without much frictional resistance and only when the pin and the socket have been moved relative to each other such that the engaged position is almost reached, the wedge portion wedges the end-potion of the socket towards the pin and therefore imposes greater friction.

The socket may have an inner surface that has a substantially uniform diametrical dimension throughout its length. However, the inner surface typically has a tapered region. In this case the tapered region may separate a region of a smaller interior diameter from a region of a larger interior diameter. The region of the smaller interior diameter typically comprises the engagement surface and is arranged so that, when the wedge portion imparts a force on the wedging surface, the region of smaller interior diameter frictionally engages with the engagement surface of the pin and typically is not positioned at an end of the inner surface.

The pin may have an outer surface that is of a substantially uniform diametrical dimension. Alternatively, the outer surface of the pin may have a tapered region. The tapered region may separate a region of a larger exterior diameter from a region of a smaller exterior diameter. In this case the region of the larger exterior diameter typically comprises the engagement surface and is arranged so that, when the wedge portion imparts a force on the wedging surface, the region of larger exterior diameter frictionally engages with the engagement surface of the socket and typically is not positioned at an end of the outer surface.

In a specific embodiment of the present invention, the socket has an inner surface that has a tapered region and a region of smaller interior diameter. In this embodiment the pin has an outer surface that has a substantially uniform diametrical dimension. In this case the region of the smaller interior diameter typically is positioned such that, when the wedge portion wedges the end-portion of the socket against the pin, the contact area between pin and socket increases to predetermined size. In electrical connection devices known in the prior art (see FIG. 1), the socket may contact the pin at the tip of the fingers of the socket and the electrical contact area may be relatively small. In the above-described specific embodiment the tapered shape of the inner surface of the socket or of the outer surface of the pin, respectively, may overcome this disadvantage and may, together with the wedging function of the wedge portion, result in a relatively larger contact area between the pin and the socket.

The gap typically is one of a plurality of longitudinal gaps that split the socket into three or more fingers which typically are substantially equal.

In another embodiment the device comprises at least two wedge portions and both the first and the second part have wedging surfaces, the wedge portions being arranged to impart a force on respective wedging surfaces to bias respective opposing engagement surfaces against each other.

The present invention provides in a second aspect a method of connecting a pin and a socket of an electrical connection device arranged for connection to a machine cable, the method comprising the steps of moving the pin and the socket relative to each other towards a position at which the pin and the socket are engaged, the pin and the socket having engagement surfaces and at least one of the pin and the socket having an additional wedging surface, the pin and the socket being arranged so that during engagement the engagement surface of the pin opposes the engagement surface of the socket and wedging a wedging portion to impart a force on the wedging surface wherein the pin and the socket are arranged so that the force causes pressing of one of the opposing engagement surfaces against the other engagement surface to establish an electrical contact.

The present invention provides in a third aspect an electrical connection arranged for connection to a machine cable, the device comprising:

a pin and a socket, the pin and the socket being moveable relative to each other from a released position to an engaged position, at least one of the pin and the socket having a marginal portion that is compressible or expandable in at least one direction and a wedge portion arranged such that, when the pin and the socket are moved relative to each other towards the engaged position, the wedge portion expands or compresses the marginal portion whereby the pin and the socket engage.

A specific embodiment will now be described, by way of example only, with reference to the accompanying drawings.

DETAILED DESCRIPTION OF THE PREFERRED EMBODIMENTS

Figure 1:
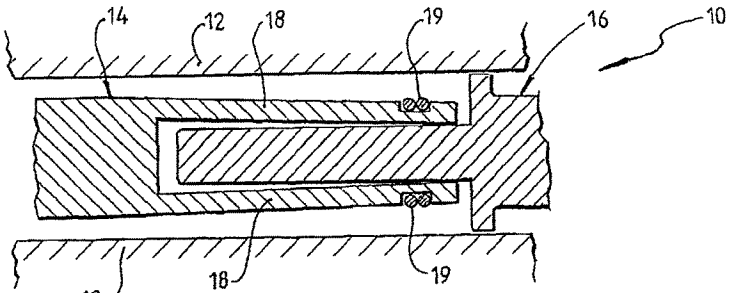
Fig. 1 Prior Art
FIG. 1 shows a schematic cross-sectional representation of an electrical connection device (prior art)
Figure 2:
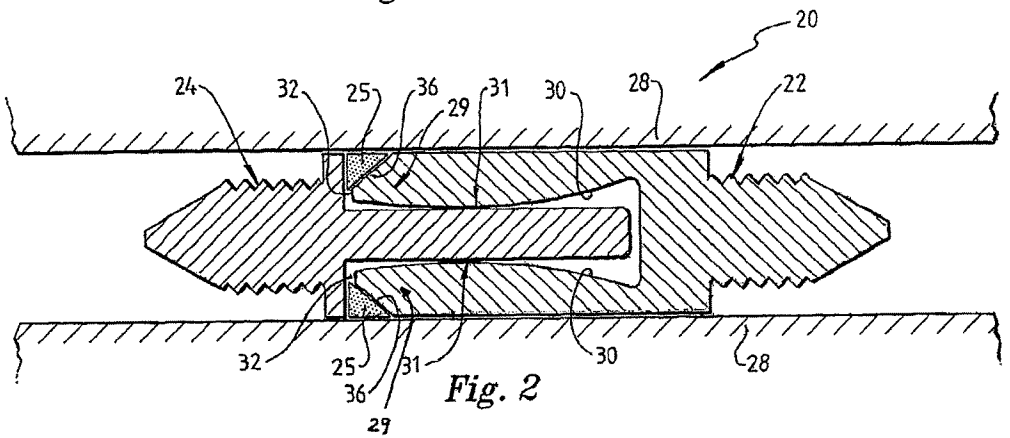
FIG. 2 shows a schematic cross-sectional representation of an electrical connection device according to a specific embodiment.
Figure 3:
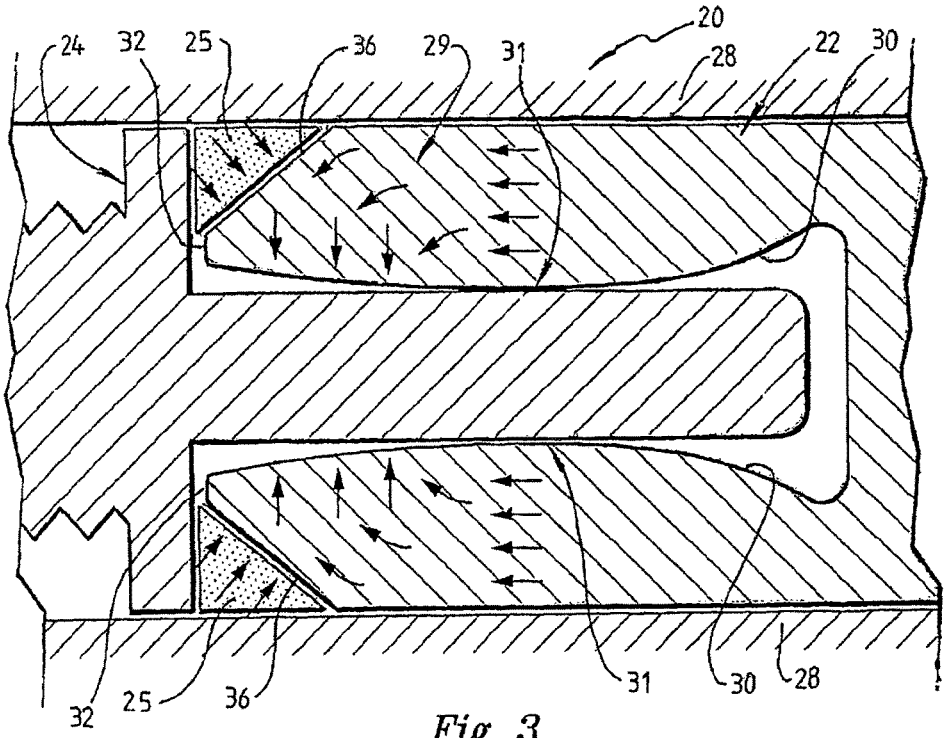
FIG. 3 and FIG. 3a illustrate schematic cross-sectional representations of the electrical connection devices in keeping with the teachings of the present invention.
Figure 4A:
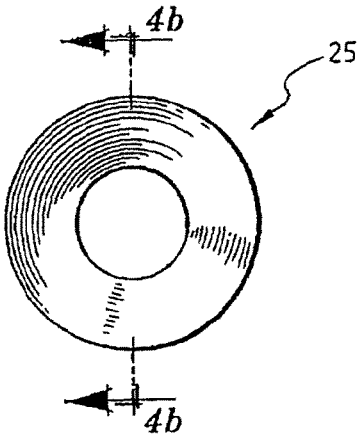
FIG. 4 shows a schematic representation of a part of the electrical connection device ((a) end view and (b) cross-sectional view) and FIG. 5 shows a schematic representation of a socket that forms a part of the electrical connection device ((a) side view and (b) end view).
Figure 4B:
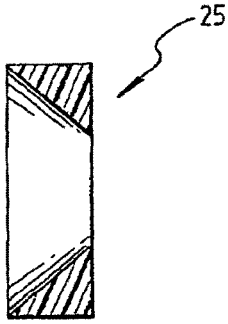

Referring to FIGS. 2 to 5, the electrical connection device 20 is now described. FIG. 2 shows the electrical connection device 20 including a socket 22 connected to a pin 24. In this embodiment, the pin 24 and the socket 22 are arranged for connection to a thimble (not shown) and the thimbles are arranged to receive a machine cable. Socket 22, pin 24 and thimbles are located in a housing 28. The socket 22, the pin 24 and the thimbles are composed of a metallic material. The device 20 comprises a wedge portion 25 that has a ring-like shape and is composed of a flexible material such as a polymeric material. In this embodiment the flexible material is an electrically conductive polymeric material. FIG. 4 shows the wedge portion 25 as viewed from the top (a) and in cross-section (b).

The socket 22 has an inner surface 30 arranged to receive the pin 24. The inner surface 30 of the socket 22 has a tapered region which is shaped such that there is a region 31 of smallest interior diameter.

Figure 5A:
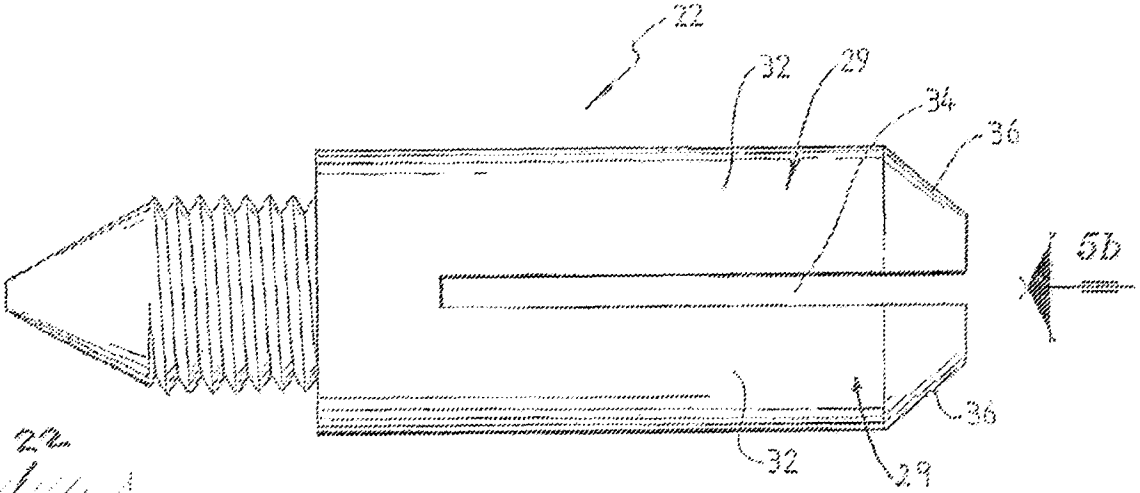
Figure 5B:
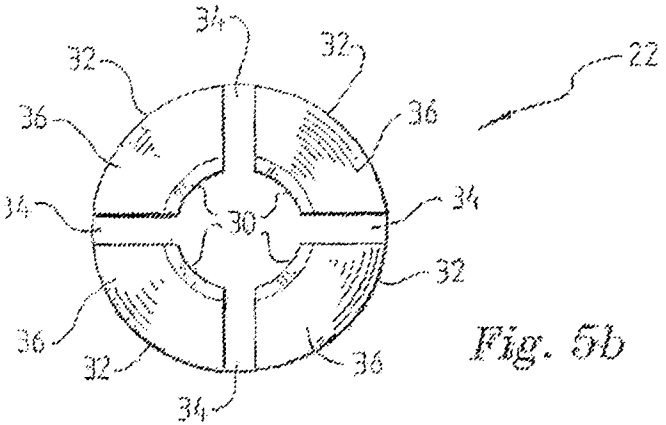

FIG. 5 shows the socket 22 ((a) side-view, (b) end-view). The socket has an end-portion 29 that is compressible and that has four fingers 32. The fingers 32 are separated by gaps 34 and each finger 32 has an angled region 36.

In this embodiment, the wedge portion 25 is designed as an insert for the pin 24. Alternatively, the wedge portion 25 may also be attached to angled surface 36. For example, the wedge portion 25 may be glued to the angled surface 36 or otherwise adhered. A wedging force is in use imparted on the angled surface 36 because the wedge portion 25 is enclosed by the angled surface 36, a shoulder of the pin 24 and the housing 28. Consequently, the wedge portion will squeeze the fingers 32 of the socket 22 towards the pin 24.

The pin 24 and socket 22 are moveable relative to each other by moving the socket 22 relative to the pin 24 and the housing 28. The pin 24 is secured in the housing 28. When the socket has been moved into the housing 28 and over the pin 24, as shown in FIGS. 2 and 3, the angled region 36 will be in contact with the ring-like wedge-portion 25. The wedge-portion 25 wedges the angled regions 36 of the fingers 32 inwardly such that a firm electrical contact is established between the inner surface 30 of the socket 22 and the pin 24. Arrows in FIG. 3 schematically indicate mechanical forces during the wedging process. Because the socket 22 has a tapered inner surface and the fingers 32 of the socket 22 are flexible, the fingers 32 will slightly bend inwardly under the wedging force and consequently the contact area between the pin 24 and the socket 22 will increase. In a variation of the embodiment shown in FIG. 2, the socket 22 comprise a region of thinner outer diameter that surrounds the region of smallest interior diameter 31 which will increase the flexibility of the fingers 32 of the socket 22.

Figure 3A:
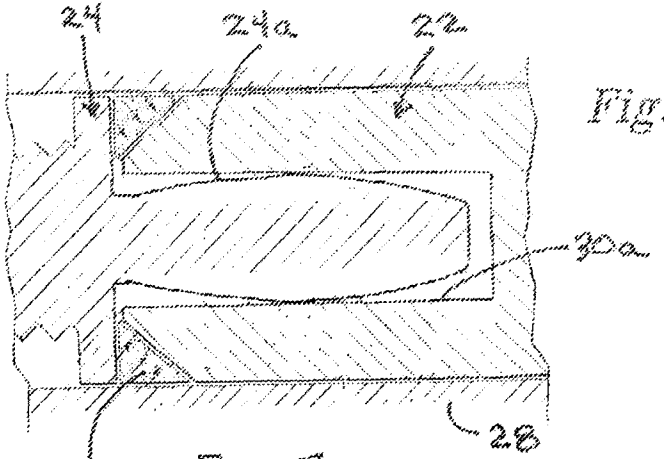

Although the invention has been described with reference to particular examples, it will be appreciated by those skilled in the art that the invention may be embodied in many other forms. For example, in an alternative to the embodiment shown in FIG. 3, and as illustrated by way of example with reference to FIG. 3a, the pin 24 may have an outwardly curved surface 24a and the socket 22 may have a straight bore 30a arranged to receive the pin. In this case the wedge portion 25 would bend the fingers 32 of the socket 22 inwardly about the apex of the curvature of the pin 22. In addition, it is to be appreciated that alternatively the socket 22 can be secured in housing 28 and the pin 24 is arranged to be moveable relative to the housing 28 and the socket 22. In this case the wedge portion 25 can, for example, be provided in form of an insert for the housing 28 that is received at the angled surface 36 of the socket 22. Further, in an alternative embodiment the inner surface of the socket may be straight and the pin may have an outer surface that is also straight. Further, the pin may include an end-portion that is expandable and arranged to expand when the socket is moved over the pin. In this case the end-portion of the pin may include fingers and a wedge-portion may be centrally located at the bottom part of the inner surface of the socket and arranged to wedge the fingers of the pin outwardly against the inner surface of the socket. The device may also comprise two or more wedge portions and both the socket and the pin may have wedging surfaces. The wedge portions may be arranged to impart a force on respective wedging surfaces to bias respective opposing engagement surfaces of the pin and the socket against each other.

The invention claimed is:

1. An electrical connection device arranged for connection to a machine cable, the device comprising:

a pin and a socket, each having engagement surfaces and one of the pin and the socket having a further surface that forms a wedging surface for the device, the pin and the socket being moveable relative to each other from a released position to an engaged position in which the engagement surfaces are engaged to form an electrical contact, at least one engagement surface comprising a convexly curved surface, and a wedge portion arranged to impart a force on the wedging surface on movement to the engaged position, the wedge portion comprising a flexible material, wherein the pin and the socket are arranged so that *in use the wedge portion is pressed between the pin and the socket so as to produce a force on the wedging surface and* the engagement surfaces move into opposing relationship on movement to the engaged position and the force imparted on the wedging surface biases one of the opposing engagement surfaces against the other engagement surface in a manner such that the engagement surfaces frictionally engage with one another,

*wherein the socket has an inner surface or the pin has an outer surface that includes the convexly curved surface that, together with the wedging function of the wedging portion, results in bending whereby a contact area between the pin and the socket at an apex of the curvature is increased, and*

*wherein the electrical connection device is arranged for delivery of a power of a few hundred kilowatts having an associated voltage of one or more kilovolts.*

[2. The electrical connection device as claimed in claim 1 being arranged for delivery of a power of a few hundred kilowatts.]

[3. The electrical connection device as claimed in claim 1 arranged for delivery of power having an associated voltage of one or more kilovolts.]

4. The electrical connection device as claimed in claim 1 wherein the wedge portion is separable from at least one of the pin and the socket.

5. The electrical connection device as claimed in claim 1 wherein the wedge portion is adhered to a portion of the pin or the socket.

6. The electrical connection device as claimed in claim 1 wherein at least one of the pin and the socket have a marginal portion that includes the wedging surface and that has at least one gap that expands or reduces when the wedge portion imparts a force on the wedging surface so that the outer perimeter of the marginal portion expands or compresses respectively.

7. The electrical connection device as claimed in claim 6 wherein the socket includes the marginal portion.

8. The electrical connection device as claimed in claim 7 wherein the wedge portion is arranged such that, when the pin and the socket are moved relative to each other to the engaged position, the wedge portion compresses the marginal portion against the pin whereby the pin and the socket engage to establish the electrical connection.

9. The electrical connection device as claimed in claim 7 wherein the socket is of a longitudinal shape and the marginal portion is an end-portion.

10. The electrical connection device as claimed in claim 1 wherein the flexible material is a polymeric material.

11. The electrical connection device as claimed in claim 1 wherein the wedge portion comprises an electrically conductive material.

12. The electrical connection device as claimed in claim 1 wherein the flexible material is a rubber.

13. The electrical connection device as claimed in claim 1 wherein the pin and the socket are of a generally round cross-section.

14. The electrical connection device as claimed in claim 1 wherein the wedge portion is provided in form of a ring-like portion positioned such that, when the pin and the socket are moved relative to each other towards the engaged position, the wedge portion wedges the end-portion of the socket against the pin.

15. The electrical connection device as claimed in claim 1 wherein the pin and the socket, when engaged, are surrounded by a sleeve.

16. The electrical connection device as claimed in claim 15 wherein the pin is carried within the sleeve and secured therein.

17. The electrical connection device as claimed in claim 1 wherein the socket has an inner surface that has a substantially uniform internal diametrical dimension.

18. The electrical connection device as claimed in claim 1 wherein the pin has an outer surface that has a substantially uniform external diametrical dimension.

[19. The electrical connection device as claimed in claim 1 wherein the pin has an outer surface that is convexly curved.]

20. The electrical connection device as claimed in claim 6 wherein the gap is one of a plurality of longitudinal gaps that split the socket into three or more fingers.

21. The electrical connection device as claimed in claim 20 wherein the fingers are substantially equal.

22. The electrical connection device as claimed in claim 1 comprising at least two wedge portions and wherein both the pin and the socket have wedging surfaces, the wedge portions being arranged to impart a force on respective wedging surfaces to bias respective opposing engagement surfaces against each other.

[23. The electrical connection device as claimed in claim 19 wherein the tapered region is a curved region.]

24. The electrical connection device as claimed in claim 1, wherein the socket has an inner surface that in convexly curved.

25. A method of connecting a pin and a socket of an electrical connection device arranged for connection to a machine cable, the method comprising the steps of*:* moving the pin and the socket relative to each other towards a position at which the pin and the socket are engaged, the pin and the socket having engagement surfaces, *the pin and the socket being moveable relative to each other from a released position to an engaged position in which the engagement surfaces are engaged to form an electrical contact,* at least one of the engagement surfaces comprising a convexly curved surface, and at least one of the pin and the socket having an additional wedging surface, the pin and the socket being arranged so that during engagement the engagement surface of the pin opposes the engagement surface of the socket*,* and wedging a wedging portion to impart a force on the wedging surface, *the wedge portion being arranged to impart a force on the wedging surface on movement to the engaged position,* the wedging portion comprising a flexible material, wherein the pin and the socket are arranged so that *in use the wedge portion is pressed between the pin and the socket so as to produce the force on the wedging surface and the engagement surfaces move into opposing relationship on movement to the engaged position and* the force *imparted on the wedging surface* causes pressing of one of the opposing engagement surfaces against the other engagement surface *such that the engagement surfaces frictionally engage with one another* to establish an electrical contact*,*

*wherein the socket has an inner surface or the pin has an outer surface that has a curved shape that, together with the wedging function of the wedging portion, results in bending whereby a contact area between the pin and the socket at an apex of the curvature is increased, and*

*wherein the electrical connection device is arranged for delivery of a power of a few hundred kilowatts having an associated voltage of one or more kilovolts.*

[26. An electrical connection device arranged for connection to a machine cable, the device comprising:

a pin and a socket, the pin and the socket being moveable relative to each other from a released position to an engaged position and having engagement surfaces, at least one of the pin and the socket having a marginal portion that is compressible or expandable in at least one direction, at least one of the engagement surfaces comprising a convexly curved surface, and a wedge portion comprising a flexible material, the wedge portion being arranged such that, when the pin and the socket are moved relative to each other towards the engaged position, the wedge portion expands or compresses the marginal portion whereby the engagement surfaces of the pin and the socket engage.]

* * * * *